(12) United States Patent
Lewis, III

(10) Patent No.: US 10,358,367 B1
(45) Date of Patent: *Jul. 23, 2019

(54) METHOD AND APPARATUS FOR TREATING SHALE GAS WASTE WATER

(71) Applicant: Tom Lewis, III, Murrysville, PA (US)

(72) Inventor: Tom Lewis, III, Murrysville, PA (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/395,091

(22) Filed: Dec. 30, 2016

Related U.S. Application Data

(62) Division of application No. 14/120,455, filed on May 20, 2014, now Pat. No. 9,533,904, which is a division
(Continued)

(51) Int. Cl.
*C02F 9/00* (2006.01)
*C02F 1/28* (2006.01)
(Continued)

(52) U.S. Cl.
CPC ............ *C02F 9/00* (2013.01); *B01J 20/20* (2013.01); *E21B 41/0057* (2013.01); *C02F 1/04* (2013.01); *C02F 1/281* (2013.01); *C02F 1/283* (2013.01); *C02F 1/441* (2013.01); *C02F 1/4672* (2013.01); *C02F 1/66* (2013.01); *C02F 1/722* (2013.01); *C02F 2101/006* (2013.01); *C02F 2101/20* (2013.01); *C02F 2101/30* (2013.01);
(Continued)

(58) Field of Classification Search
CPC .......... C02F 9/00; C02F 1/4672; C02F 1/281; C02F 2101/006; C02F 2305/023; C02F 1/66; C02F 1/441; C02F 1/04; C02F 1/283; C02F 2103/10; C02F 2101/20; C02F 2101/30; C02F 1/722; C02F 1/001; C02F 1/004; C02F 1/045; C02F 1/72; C02F 2305/02; C02F 1/28; C02F 1/46; C02F 1/4604; C02F 1/4606; C02F 1/461; C02F 1/467; C02F 1/4674; C02F 1/62; C02F 1/64; C02F 2103/04; C02F 2103/36; C02F 2103/365; E21B 41/0057; E21B 43/40; E21B 43/26; E21B 43/34; B01D 37/00; B01D 37/02; B01J 20/02; B01J 20/10; B01J 20/12; B01J 20/20; B01J 2220/42; B01J 2220/4806; B01J 2220/4812; B01J 2220/50

USPC .......... 210/651, 708, 721, 748.01, 758, 759, 210/774, 806

See application file for complete search history.

(56) References Cited

U.S. PATENT DOCUMENTS 3,405,050 A * 10/1968 Bovard ................. B01D 35/06
204/240
4,048,283 A 9/1977 Lee
(Continued)

*Primary Examiner* — Joseph W Drodge
(74) *Attorney, Agent, or Firm* — Price & Adams, P.C.

(57) ABSTRACT

Organo clay and activated carbon are mixed to form a particle mixture. The particle mixture is contacted with waste water having chlorides and other contaminants, such as organic materials, heavy metals, chlorides, and low level radio nuclei in solution. Acids, oxidizing chemicals, and compressed air are added to pretreat and to treat the waste water. The mixture is filtered with catalytic activated carbon filters to remove the remaining contaminants. The filters produce a clean chloride solution that is discharged or is subjected to a finishing process to produce a marketable chloride product.

11 Claims, 11 Drawing Sheets

Related U.S. Application Data of application No. 12/924,315, filed on Sep. 24, 2010, now Pat. No. 8,727,007.

(60) Provisional application No. 61/277,493, filed on Sep. 25, 2009.

(51) Int. Cl.

| | |
|---|---|
| *C02F 1/04* | (2006.01) |
| *C02F 1/44* | (2006.01) |
| *C02F 1/66* | (2006.01) |
| *B01J 20/20* | (2006.01) |
| *E21B 43/26* | (2006.01) |
| *E21B 43/40* | (2006.01) |
| *E21B 41/00* | (2006.01) |
| C02F 101/30 | (2006.01) |
| C02F 101/20 | (2006.01) |
| C02F 103/10 | (2006.01) |
| C02F 1/467 | (2006.01) |
| C02F 101/00 | (2006.01) |
| C02F 1/72 | (2006.01) |

(52) U.S. Cl.
CPC .... *C02F 2103/10* (2013.01); *C02F 2305/023* (2013.01); *E21B 43/26* (2013.01); *E21B 43/40* (2013.01)

(56) References Cited

U.S. PATENT DOCUMENTS

| | | | |
|---|---|---|---|
| 4,436,635 A * | 3/1984 | Abrams | B01D 37/02 210/806 |
| 4,610,792 A | 9/1986 | Van Dils et al. | |
| 5,262,063 A | 11/1993 | Yen | |
| 5,531,865 A | 7/1996 | Cole | |
| 6,573,336 B1 * | 6/2003 | Inagaki | B01D 21/0012 525/332.2 |
| 8,097,128 B1 | 1/2012 | Sherry | |
| 8,727,007 B1 | 5/2014 | Lewis, III | |
| 2005/0098504 A1 * | 5/2005 | Manz | C02F 1/008 210/721 |
| 2006/0226083 A1 * | 10/2006 | Suzuki | C02F 1/28 210/665 |
| 2007/0102359 A1 * | 5/2007 | Lombardi | B01D 17/085 210/639 |
| 2007/0119779 A1 * | 5/2007 | Muramoto | B01D 61/02 210/639 |
| 2008/0290019 A1 * | 11/2008 | Moss | B01J 20/26 210/437 |
| 2009/0192053 A1 * | 7/2009 | Crews | C09K 8/516 507/201 |
| 2009/0223894 A1 * | 9/2009 | Muramoto | B01D 61/025 210/636 |
| 2010/0206744 A1 * | 8/2010 | Pereira | C01D 3/14 205/687 |
| 2010/0320155 A1 | 12/2010 | Enos et al. | |
| 2011/0042320 A1 | 2/2011 | Allen | |
| 2011/0104038 A1 * | 5/2011 | DiTommaso | C02F 1/048 423/430 |
| 2013/0319939 A1 | 12/2013 | Bower | |

\* cited by examiner

METHOD AND APPARATUS FOR TREATING SHALE GAS WASTE WATER

CROSS REFERENCE TO RELATED APPLICATIONS

This application is a division of U.S. application Ser. No. 14/120,455 filed May 20, 2014 which is a division of U.S. application Ser. No. 12/924,315 filed Sep. 24, 2010, now U.S. Pat. No. 8,727,007, which claims the benefit of U.S. Provisional Application No. 61/277,493 filed Sep. 25, 2009.

BACKGROUND OF THE INVENTION

1. Field of the Invention

This invention relates to a method and apparatus for treating shale gas waste water that includes dissolved chlorides and, more particularly, to a method and apparatus for producing a chloride-based product from a clean chloride solution obtained through a waste water treatment process.

2. Description of the Related Art

Purified water is used in many industries including the chemical, foodstuffs, electronics, power, medical and pharmaceutical industries, as well as for human consumption. Typically, prior to use in any one of these fields, the water is treated to reduce the level of contaminants to acceptable levels. These treatment techniques include disinfection, distillation, filtration, ion exchange, reverse osmosis, photooxidation, ozonation, and combinations thereof.

Various levels of purity may be required for different end uses. Water quality may be regulated by various government agencies and trade organizations including the U.S. Environmental Protection Agency (EPA) and the Food and Drug Administration (FDA).

One field in which the treatment of water is necessary is in the natural gas extraction field. Extracting natural gas trapped in shale formations and other gas reservoirs often requires the use of hydraulic fracturing (also known as "fracing" or "well stimulation"). Fracing has been used safely and effectively for over sixty years. The goal of the fracing process is to create a pathway of man-made cracks in the rock that allow gas to flow from the shale into the wellbore. Without this technique, many natural gas reservoirs would not produce natural gas.

The fracing process is very water intensive, so that steps must be taken to protect groundwater. In very tight rock formations (i.e. rock formations in which gas cannot migrate through the formation naturally), a greater amount of water is used to stimulate the fractures and enhance gas flow. These formations require more water than a traditional shallow well.

The fracing of a shale well takes place after the well has reached a desired vertical and/or horizontal depth and can last for several days. Once well casing is cemented in place to protect the water aquifers and gas production zones, a charge is fired into the formation at the end of the wellbore. It perforates the steel casing, cement and shale formation to provide a pathway for the fresh water injection.

Fluids pumped under pressure act as a wedge to crack the rock during fracing operations. The fluid includes water, sand, and special-purpose additives that are injected into the wellbore. The additives are mixed in self-contained systems where fluids are not exposed to the environment. Some of the additives are commonly referred to as "slickers" or "slicker" chemicals.

Some additives include acids, such as hydrochloric acid or muriatic acid, which dissolve minerals and initiate cracks in the rocks, and anti-bacterial agents, such as glutaraldehyde, which eliminate bacteria in the water that produce corrosive by-products. Breakers, such as ammonium persulfate, that allow for a delayed break down of the gel are also used to thicken the water in order to suspend the sand. Corrosion inhibitors, such as n,n-dimethylformamide, are also used to prevent the corrosion of pipe.

Common additives also include crosslinking agents, such as borate salts, that maintain fluid viscosity as temperature increases, and gels, such as Guar gum or hydroxyethyl cellulose, that thicken the water in order to suspend the sand. Other common additives include chemicals for controlling iron content, such as citric acid, which prevent the precipitation of metal oxides, and potassium chloride that creates a brine carrier fluid.

Oxygen scavengers, such as ammonium bisulfate, are used to remove oxygen from the water to protect pipes from corrosion. Other common additives include pH adjusting agents, such as sodium or potassium carbonate, for maintaining the effectiveness of other components such as the crosslinking agents.

Other additives also include proppants, such as silica or quartz sand, which allows the fractures to remain open so that the gas can escape, and scale inhibitors, such as ethylene glycol, which prevent scale deposits in the pipe. Surfactants, such as isopropanol, are also used to increase the viscosity of the fracture fluid.

A significant portion of the fluid returns to the surface through the protective casing. It is highly monitored, collected and saved in tanks or lined pits on the well site for later transport to permitted disposal facilities. This returned fluid, called "flowback," can pick up heavy salts and minerals.

Additional amounts of water used in the fracing process remain in the shale formation nearly a mile below the Earth. The remaining water returns slowly over time at the well site and is redirected into collection tanks where it is removed and treated.

The fracing process produces a waste water stream that is contaminated with multiple contaminants, namely oil/grease, soluble organics, heavy salts, minerals, trace metals, extremely high concentration of chlorides, and, optionally, radioactive nuclei. Since the need to protect ground water is great, the waste water must be treated to remove the contaminants so that the waste water does not contaminate the ground water.

Many methods for treating waste water are known. U.S. Patent Publication Nos. 2008/0116136 and 2009/0045135 disclose general methods for treating waste water. Other methods include methods for removing metals, particularly heavy metals, such as the method disclosed in U.S. Pat. Nos. 3,761,381, 4,157,942, 4,171,255, and 4,652,352.

U.S. Pat. No. 4,652,352 discloses a method for recovering heavy metals from dilute solutions. U.S. Pat. Nos. 3,761,381, 4,157,942 and 4,171,255 disclose methods for recovering heavy metals from aqueous solutions.

U.S. Pat. No. 6,214,233 discloses a method for treating a waste water stream that contains cyanide bearing compounds and heavy metals, such as copper, silver, nickel, and iron. The method utilizes a stripping solution to remove adsorbed metals from adsorption materials.

U.S. Pat. No. 5,770,090 discloses a method for treating a waste water stream that contains heavy metals, such as chromium, zinc, and copper. The method utilizes activated carbon as an adsorption material. The method also utilizes a stripping solution to remove the adsorbed metals from the adsorption material.

U.S. Pat. No. 3,973,987 discloses a water recycle treatment system. The system feeds treated water to a distillation unit to precipitate the metals and salts in sludge and also forms a water vapor output.

Other methods for treating waste water are directed to methods and apparatus for removing organic compounds from the water. U.S. Pat. No. 4,929,359 discloses a method for treating highly concentrated and toxic petroleum-based and synthetic fuels waste waters, such as oil shale retort water using electrolysis. The treatment is performed in a reactor that contains polyurethane foams.

U.S. Pat. No. 7,441,665 discloses a water purification cartridge. The water purification cartridge includes porous diatomaceous earthen ceramic water filters or carbon filters packed with granulated activated carbon or block.

U.S. Pat. No. 6,709,585 discloses a waste water purification system. The system includes a tank-filter for performing a pre-treatment step. The tank includes a flocculant that is uniformly mixed with an agitator. The pretreated water is directed to a collecting tank for clarification. The clarified, pre-treated water is directed through a safety filter to a battery of activated carbon columns for treatment. In another embodiment, a polypropylene bag filter that includes diatomaceous earth is used to pre-treat the waste water.

Many waste water treatment methods utilize diatomaceous earth or activated carbon. U.S. Pat. No. 4,568,463 discloses a method and apparatus for purifying aqueous solutions. A diatomaceous earth coarse filter is used to pre-treat the solution. An activated charcoal column is used to finish the process. Optionally, chloride is utilized to kill microorganisms.

U.S. Pat. No. 4,454,044 discloses a water treatment process. The process involves contacting water with a relatively small amount of diatomaceous earth particles or activated carbon particles to adsorb impurities. After contact with the particles, the water is passed through a filter.

U.S. Pat. No. RE 35,871 discloses a water reclamation system for car washes. The system uses a diatomaceous earth filter for removing particulates and a carbon filter for removing organic contaminants. The diatomaceous earth filter removes particles of dirt, oil, and rust. The carbon filter includes activated charcoal that removes dissolved organic materials, such as oil and surfactants. The system also utilizes chloride or ozone to kill algae.

Other methods for treating water are directed to desalination methods. A publication entitled "Capacitive Deionization Technology™: An alternative desalination solution" by T. J. Welgemoed and C. F. Schutte, Desalination 183 (2005) at 327-40, discloses that possible desalination techniques for brackish water include reverse osmosis, electrodialysis, and a low-pressure non-membrane desalination process that is identified by the trademark Capacitive Deionization Technology™.

A publication entitled "Desalination technology could clean up wastewater from coal-bed methane production" by K. Christen, Environmental Science & Technology Online News, Jan. 11, 2006, accessed http://pubs.acs.org on Oct. 28, 2008, discloses that such technologies can be used in the treatment of waste water from coal-bed methane production.

However, none of the above described water treatment methods are effective in treating the waste water streams that include the combination of oil and grease, soluble organics, trace metals, and extremely high concentration of chlorides that are produced in "fracing" operations in the extraction of natural gas from shale formations. Accordingly, an improved waste water treatment is needed.

SUMMARY OF THE INVENTION

In accordance with the present invention there is provided a method for treating water. A stream of brine water having in solution organic materials, heavy metals, and chlorides with at least a portion of the organic materials forming an emulsion within the brine water is provided. Organo clay is mixed with particles of activated carbon to form a particle mixture for treating the stream of brine water. The particle mixture is contacted with the stream of brine water to remove the organic materials and the heavy metals from the stream of brine water. The particle mixture and stream of brine water is filtered to remove the particles of activated carbon to form a clean chloride solution.

Further in accordance with the present invention, there is provided a method for treating an aqueous chloride solution. An aqueous chloride solution having heavy metals and organic compounds with at least a portion of the organic compounds forming an emulsion and a portion of the organic compounds including toxic organic compounds therein is provided. The aqueous chloride solution is pretreated to remove at least a portion of the organic compounds and heavy metals. The pH of the aqueous chloride solution is lowered to break down the emulsion. The aqueous chloride solution is oxidized to remove the toxic organic compounds. The aqueous chloride solution is passed through a filter to form a clean chloride solution.

Further in accordance with the present invention, there is provided a method for treating water. A stream of brine water having in solution organic materials, heavy metals, and chlorides with a portion of the organic materials forming an emulsion therein is provided. Organo clay is mixed with particles of activated carbon, an acid selected from the group consisting of organic acids and mineral acids, and a peroxide compound to form a particle mixture for treating the stream of brine water. The particle mixture is contacted with the stream of brine water to remove the organic materials and the heavy metals from the stream of brine water. The particle mixture and the stream of brine water is directed into a filter system having a catalyst to form a clean chloride solution.

Accordingly, a principal object of the present invention is to provide a method for treating waste water.

Another object of the present invention is to provide a method for removing organic compounds, oil and grease emulsions, and heavy metals from an aqueous chloride solution.

Another object of the present invention is to provide a method suitable for producing a chloride-based product from a clean chloride solution.

A further object of the present invention is to provide a method for treating a waste water by-product from shale oil and gas production.

A further object of the present invention is to provide a method suitable for treating shale gas brine waste water via catalytic activated carbon.

These and other objects of the present invention will be more completely described and disclosed in the following specification, accompanying drawings, and appended claims.

DESCRIPTION OF THE PREFERRED EMBODIMENTS

Figure 1:
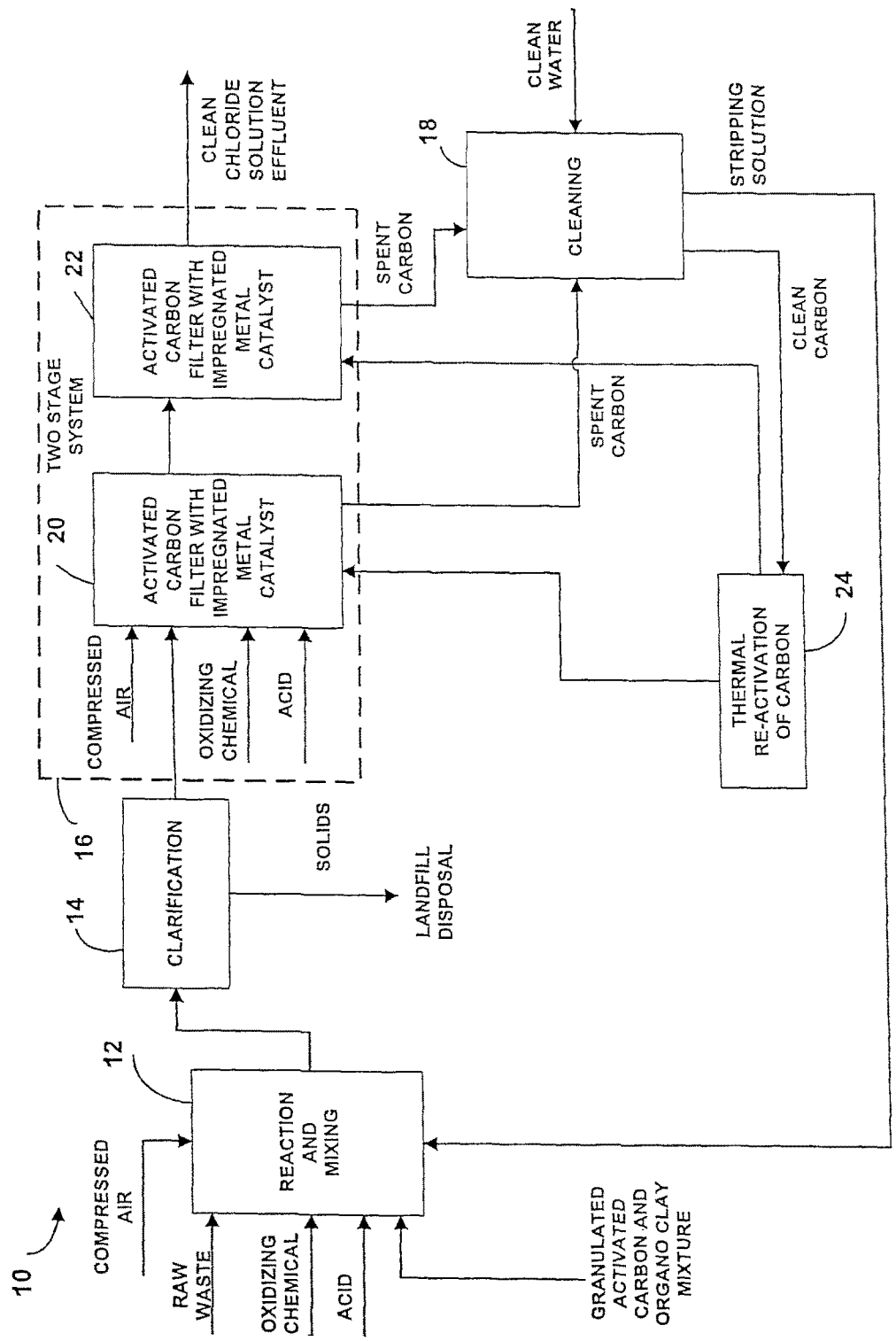
FIG. 1 is a conceptual flow diagram illustrating a two-part method for treating waste water having a pretreatment step and a catalytic carbon filtering step.

Referring to the drawings and particularly to FIG. 1, there is illustrated apparatus, generally designated by the numeral 10, for performing a method for treating waste water, particularly waste water that has been obtained from fracing operations within a shale formation. The apparatus 10 is suitable for treating waste water streams that include brine water having organic materials, heavy metals, and chlorides in solution. Some of the organic materials form oil and grease emulsions within the waste water. The waste water also includes trace amounts of normally occurring radio nuclei or NORMS, such as low-level radio nuclei.

The chlorides are present in the waste water stream as a result of the adsorption of chloride from the shale formation into solution. The adsorption of chloride results in the formation of dissolved chlorides in the solution. The chloride concentration typically ranges from 20,000 ppm to 250,000 depending upon the number of times the waste water has been cycled through the shale formation.

As shown in FIG. 1, the apparatus 10 is particularly adapted to treat at least two different types of waste water streams. The first type of waste water stream has been cycled through a shale formation at least one time. The chloride concentration of the waste water from these types of waste water streams will include up to about 80,000 ppm from this cycle.

The second type of waste water stream has been cycled through a shale formation as many as five times or more. The chloride concentration of the waste water from these types of streams will be as much as about 250,000 ppm. Typically, the chloride concentration ranges from 50,000 ppm to 225,000 ppm.

The waste water for both types of waste water streams also includes heavy metals, such as iron, aluminum, magnesium, and zinc, and soluble organics, such as benzene, xylene, toluene, and phenols. The waste water typically includes an emulsion that is formed from oil and grease. The waste water also includes trace amounts of radioactive nuclei, barium, or a combination of both.

Sequence No. 1

Referring to FIG. 1, the apparatus 10 includes a pretreatment unit 12, a clarification unit 14, a filtration unit 16, and a carbon cleaning system 18. The apparatus 10 removes the organic materials and the heavy metals from the waste water. The apparatus 10 also breaks down the oil and grease emulsion within the waste water to produce an essentially clean chloride solution.

The pretreatment unit 12 treats the waste water to produce a pretreated chloride solution. The pretreatment unit 12 is connected in series with the clarification unit 14, which produces a clarified pretreated chloride solution. The clarification unit 14 is connected in series to the filtration unit 16, which removes the remaining contaminants in the clarified pretreated chloride solution to produce the clean chloride solution.

As shown in FIG. 1, the carbon cleaning system 18 connects to the filtration unit 16 to reactivate filter media within the filtration unit 16. The carbon cleaning system 18 utilizes clean water to produce a stripping solution that regenerates the filter media. The regenerated filter media is recycled back into the filtration unit 16. The stripping solution is directed to pretreatment unit 12 for recirculation through the apparatus 10.

The pretreatment unit 12 receives raw waste water (brine water) for treatment with a combination of activated carbon, organo clay materials, acids, and oxidizing chemicals. Optionally, the mixture is combined with compressed air to enhance the pretreatment step. The pretreatment unit 12 produces a pretreated chloride solution for the clarification unit 14.

The organo clay materials adsorb heavier organic compounds within the waste water stream. The activated carbon in either powdered or granular form adsorbs other soluble organic compounds and the heavy metals in the waste water stream. The acids lower the pH of the waste water stream to break down emulsions. The oxidizing chemicals remove toxic organic compounds.

As shown in FIG. 1, the pretreated chloride solution is conveyed from the pretreatment unit 12 to the clarification unit 14 through conventional methods. The clarification unit 14 separates certain solid particles from the mixture pretreated chloride solution for disposal in a landfill. In addition, a selected portion of the solid particles from the clarification unit 14 are recycled back to the pretreatment unit 12 into contact with the stream of brine water. The clarification unit produces a clarified pretreated chloride solution for the filtration unit 16.

The clarified pretreated chloride solution is conveyed through conventional methods to the filtration unit 16 to perform a catalyzed filtration step. The filtration unit 16 includes a pair of filters 20, 22 that are impregnated with catalyst materials to enhance the removal of contaminants from clarified pretreated chloride solution.

The filtration unit 16 receives acids that break down remaining emulsions and oxidizing chemicals that remove residual toxic organic compounds. Optionally, compressed air enhances the effectiveness of the acids, oxidizing chemicals, and the filters 20, 22 within the filtration unit 16.

As shown in FIG. 1, the filters 20, 22 remove the remaining organic compounds, heavy metals, and radio nuclei within the clarified pretreated chloride solution. Preferably, the filters 20, 22 have the ability to remove trace amounts of the organic compounds, heavy metals, and radio nuclei.

The spent carbon from the filters 20, 22 is directed by conventional methods to a carbon cleaning system 18 for treatment. Clean water is added to the carbon cleaning system 18 to form a stripping solution to clean the spent carbon. The stripping solution is pumped to the pretreatment unit 12 for re-circulation within the apparatus 10.

Once the stripping solution cleans the spent carbon, the carbon is reactivated through a reactivation step in a reactivation system 24 through any suitable reactivation method. Preferably, the spent carbon is thermally reactivated and directed back to the filters 20, 22 for re-use.

As shown in FIG. 1, the filtration unit 16 produces a clean chloride solution that is suitable for disposal or for subsequent processing to obtain chloride-based chemical products. The clean chloride solution is subject to one or more finishing processes, such as chemical product production, electrochemical production, or distillation to produce a chloride chemical product. Alternatively, the clean chloride solution is suitable for reverse osmosis or deep well injection.

Sequence No. 2

Figure 2:
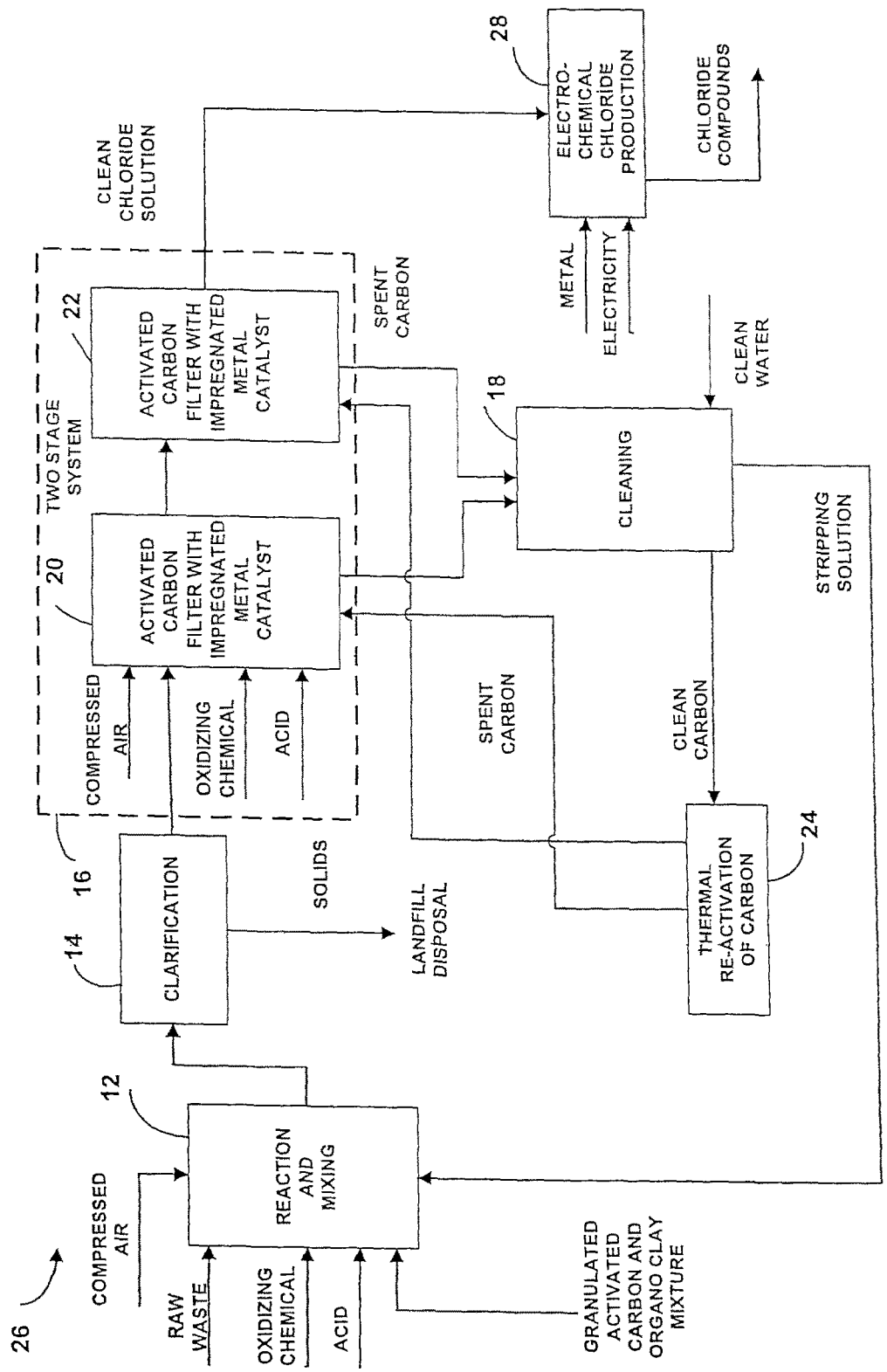
FIG. 2 is a conceptual flow diagram of the method shown in FIG. 1, illustrating an electrochemical chloride production step.
Figure 3:
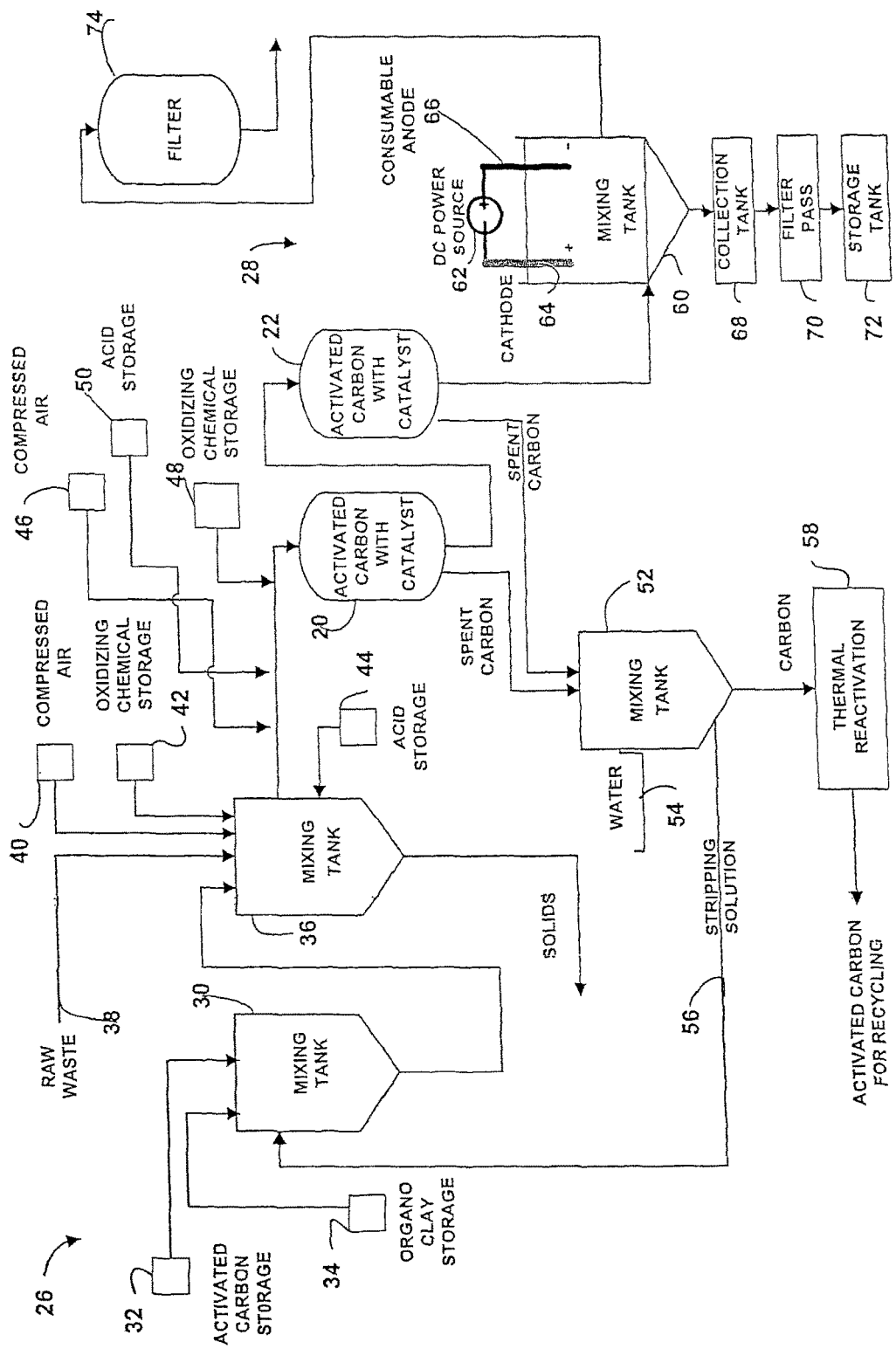
FIG. 3 is a process flow diagram for the method shown in FIG. 2.

Referring now to FIGS. 2-3, another embodiment of an apparatus, generally designated by the numeral 26, for treating a brine waste water stream from a shale formation in which like elements are identified by like numerals shown in FIG. 1. The apparatus 26 includes a pretreatment unit 12, a clarification unit 14, a filtration unit 16, a carbon cleaning system 18, and a finishing unit 28.

The pretreatment unit 12 includes a mixing tank 30 for receiving activated carbon particles 32 and organo clay 34 to form a particle mixture.

As shown in FIGS. 2-3, the pretreatment unit 12 blends particles of activated carbon with an organo clay material in the mixing tank 30 to produce a mixture for treating the waste water stream. The organo clay material adsorbs the heavier organic compounds. The activated carbon adsorbs other soluble organic compounds and the heavy metals in the waste water stream.

The pretreatment unit 12 mixes the activated carbon particles with the organo clay material to form a particle mixture for treating the waste water stream. The activated carbon particles and the organo clay are mixed in step 12 in any suitable proportion to treat the waste water stream. Preferably, the activated carbon particles are coated with the organo clay before being added to the waste water stream.

The activated carbon particles 32 and the organo clay 34 are mixed in any suitable proportion to treat the waste water stream. Suitable proportions include ratios of activated carbon to diatomaceous earth ranging from 100:1 to 1:1. Preferably, the activated carbon particles 32 and organo clay are mixed in ratios of activated carbon to organo clay from about 50:1 to 15:1.

Suitable activated carbon particles include particles made from activated charcoal, activated coal, or any form of porous carbon having a large degree of surface area that is available for adsorption or chemical reaction. Suitable activated carbon particles are prepared from powdered activated carbon, granulated activated carbon, extruded activated carbon, impregnated activated carbon, polymers coated carbon, or any other suitable source of activated carbon. Preferably, the activated carbon particles 32 include granulated activated carbon particles.

Referring to FIGS. 2-3, the organo clay 34 includes any suitable organo-clay or clay-organic complex that includes phyllosilicates, smectites, vermiculites, kaolins, diatomaceous earth compounds, or other similar compounds. Preferably, the organo clay 34 includes diatomaceous earth compounds, such as certain well-known mineral compounds having high adsorption and low bulk density.

Suitable diatomaceous earth compounds also include naturally occurring saltwater diatomaceous earth, naturally occurring freshwater diatomaceous earth, calcined diatomaceous earth, celite, perlite, and man-made compounds that include essentially identical or equivalent compositions to naturally occurring diatomaceous earth compounds.

The use of diatomaceous earth adds sodium to the waste water, which improves brine recovery. Certain raw waste water compositions do not have a sufficient ratio of sodium to chloride to complete the recovery of the chloride as a high purity salt material. The use of diatomaceous earth increases the sodium concentration of the waste water by approximately 60%.

As shown in FIG. 3, the mixture of activated carbon particles and organo clay is conveyed by pumping to a second mixing tank 36. Within the mixing tank 36, the particle mixture contacts the brine waste water stream 38 to remove contaminants.

Chemicals are injected into the waste stream 38 to enhance the ability of the particle mixture to remove contaminants. The chemicals include acids for lowering the pH to break down the oil and grease emulsion within the waste water stream. The chemicals also include oxidizing chemicals that add oxygen to the solution to act as a catalyst to reduce the toxicity of certain soluble organic materials within the solution.

The particle mixture of activated carbon and organo clay is mixed with the waste water stream in the mixing tank 36 for a predetermined amount of time to remove the organic materials and the heavy metals. Preferably, the particle mixture produced contacts the waste water stream for a period of time between fifteen minutes to two hours.

The pretreatment unit 12 injects compressed air 40 to facilitate the removal of the organic materials and the heavy metals from the waste water stream 38. Preferably, the pretreatment unit 12 utilizes low pressure compressed air. Optionally, the waste water stream 38 is subject to agitation (not shown) to further enhance the removal of the contaminants and produce a pretreated chloride solution.

As shown in FIG. 3, at least one oxidizing chemical 42 and acids 44 are added to the particle mixture and the waste water to enhance the removal of contaminants.

The oxidizing chemical 42 includes any suitable chemical or combination of chemicals that add oxygen to the solution, such as peroxides, chlorates, perchlorates, nitrates, and permanganates. The oxidizing chemical 42 also acts as a catalyst to reduce the toxicity of soluble organic materials within the solution. Preferably, the oxidizing chemical 42 includes a peroxide compound, such as a hydrogen peroxide.

The acids 44 include any suitable acid that lowers the pH of the waste water solution. Suitable acids include mineral acids, such as hydrochloric acid, nitric acid, phosphoric acid, sulfuric acid, boric acid, hydrofluoric acid, and hydrobromic acid, or organic acids, such as lactic acid, acetic acid, formic acid, citric acid, or oxalic acid. Preferably, the acids 44 include only organic acids.

Further, as shown in FIG. 3, the particle mixture, the compressed air 40, the oxidizing chemical 42, and the acids are mixed together and contact the waste water stream 38 simultaneously in the mixing tank 36. Optionally, the particle mixture, the compressed air 40, the oxidizing chemical 42, and the acids 44 are added in series. Alternatively, one or more of the compressed air 40, the oxidizing chemical 42, and the acids 44 are omitted.

The mixing tank 36 is a conventional mixing tank having predetermined dimensions and is constructed from any suitable materials. The mixing tank 36 includes a suitable filter for separating solid waste from the treated waste water stream. Preferably, the filter is a 20 micron cartridge filter.

Once the waste water stream 38 is pretreated in the mixing tank 36, the waste water stream 38 is conveyed to a clarification unit 14 to separate the particles within the particle mixture and other solid waste from the pretreated chloride solution. The clarification unit 14 is a gravity separation device or any other suitable separation device. Preferably, the clarification unit 14 is a lamella clarifier.

The clarification unit 14 produces a clarified pretreated chloride solution that is directed to the filtration unit 16. Preferably, the filtration unit 16 is a two stage filtration system that includes a pair of filters 20, 22 connected in series. The filters 20, 22 produce a clean chloride solution suitable for discharge or for subsequent processing.

The filters 20, 22 include activated carbon filters impregnated with one or more catalysts therein. Preferably, the filters 20, 22 include catalytic activated carbon filters formed from beds of activated carbon. The activated carbon beds are positioned within tanks and are pretreated to have a predetermined pH level to enhance the adsorption of the residual heavy metals, organic compounds, and low level radionuclei in the clarified pretreated chloride solution. Optionally, the filtration unit 16 includes a controller (not shown) for controlling the pH level of filters 20, 22 to optimize the removal of the contaminants from the waste water stream 38.

The filters 20, 22 shown in FIG. 3 are configured in a predetermined arrangement and are constructed from any suitable materials using any suitable fabrication process. A suitable arrangement includes two identical adsorber tanks arranged in the manner set forth in U.S. Pat. No. 6,214,233, which is incorporated herein by reference, which are identical in design and commercially available from Tigg Corporation. Both tanks utilize granular activated carbon from Calgon Carbon Corp. under the trademark "Filtrasorb 400" and are fabricated of steel and skid mounted. Each tank includes conventional pipes, valves, and fittings. The tanks are lined with an abrasion flake glass coating available from Ceilicote Coatings, Inc.

Upstream of the first filter 20, compressed air 46, an oxidizing chemical 48, and an acid 50 are added to the pre-treated waste water to remove additional contaminants. After the solution has been filtered for a predetermined residence time, the solution is directed to the second filter 22 for additional filtering.

Unlike the filter media within the adsorber tanks in in U.S. Pat. No. 6,214,233, the filters 20, 22 include catalyst material that is embedded or impregnated therein. The selection of the catalyst material is not critical. Preferably, the catalyst material is a metal impregnated catalyst material that includes a suitable metal impregnated on the activated carbon, such as titanium, vanadium, chromium, cobalt, nickel, copper, iron, molybdenum, manganese, gold, silver, palladium, platinum, or a combination thereof.

As shown in FIG. 3, the spent carbon from the filters 20, 22 is directed by pumping to a regeneration mixing tank 52 within the carbon cleaning system 18 for treatment. Clean water 54 is added to the mixing tank 52 to form a stripping solution 56 to clean the spent carbon. The stripping solution 56 is pumped to the mixing tank 36 for re-circulation within the apparatus 26.

The carbon cleaning system 18 operates in a manner similar to the system for regenerating the adsorber tanks that is disclosed in U.S. Pat. No. 6,214,233, in which the tanks are separately regenerated. The carbon cleaning system 18 includes valves, pumps, and, optionally, probes similarly arranged in a predetermined configuration, As further shown in FIG. 3, a conventional pumping mechanism (not shown), such as a pump or a plurality of pumps, first directs the clean water 54 through an open and closed sequence of valves in a closed loop through the regeneration mixing tank 52 to form the stripping solution 56. The stripping solution 56 is directed upwardly to the mixing tank 36 and back to the regeneration mixing tank 52. After regeneration both filters 20, 22 are opened to allow the stripping solution remaining to flow back to regeneration mixing tank 52.

Once the stripping solution 56 cleans the spent carbon, the carbon is reactivated through a reactivation step in a reactivation system 58 through any suitable reactivation method. Preferably, the spent carbon is thermally reactivated and directed back to the filters 20, 22 for reuse.

The filtration unit 16 produces a clean chloride solution from the filter 22. Initially, the filtration unit 16 removes a substantial fraction of the chloride from the solution, as much as 75% or more chloride from a solution that initially includes 80,000 ppm of chlorides. After a predetermined amount of time, the filtration unit 16 will remove from between 10% to 12.5% of the chlorides from the clean chloride solution.

As shown in FIG. 3, the clean chloride solution is directed to a mixing tank 60 within the finishing unit 28 for producing metal halide products, particularly metal-chloride compounds. The finishing unit 28 includes a direct current power source 62, a cathode 64, and a sacrificial anode 66 for electrochemical chloride production. The cathode 64 and the anode 66 are positioned within the mixing tank 60. The clean chloride solution contacts at least a portion of the cathode 64 and the sacrificial anode 66.

As shown in FIG. 3. The cathode 64 and the anode 66 are electrically connected to the power source 62 so that the power source 62, the cathode 64, the anode 66, and the clean chloride solution form an electrochemical cell for producing a chloride product.

The anode 66 is formed from any suitable metal product that has the ability to react with the chloride within the chloride solution to form a chloride product. Suitable metal products include zinc, copper, iron, nickel, cobalt, manganese, or other metals that form chloride compounds. The chloride products precipitate from the solution to form the chloride compounds, such as zinc chloride, cupric chloride, ferric chloride, nickel chloride, cobalt chloride, and manganese chloride.

A portion of the chloride solution is directed to a collection tank 68 for collection of the chloride products. The collection tank 68 includes a filter 70 to facilitate collection of the products. The collected products are stored in a storage tank 72. The remainder of the chloride solution is directed to a filter 74 for additional filtration and discharge.

Sequence No. 3

Figure 4:
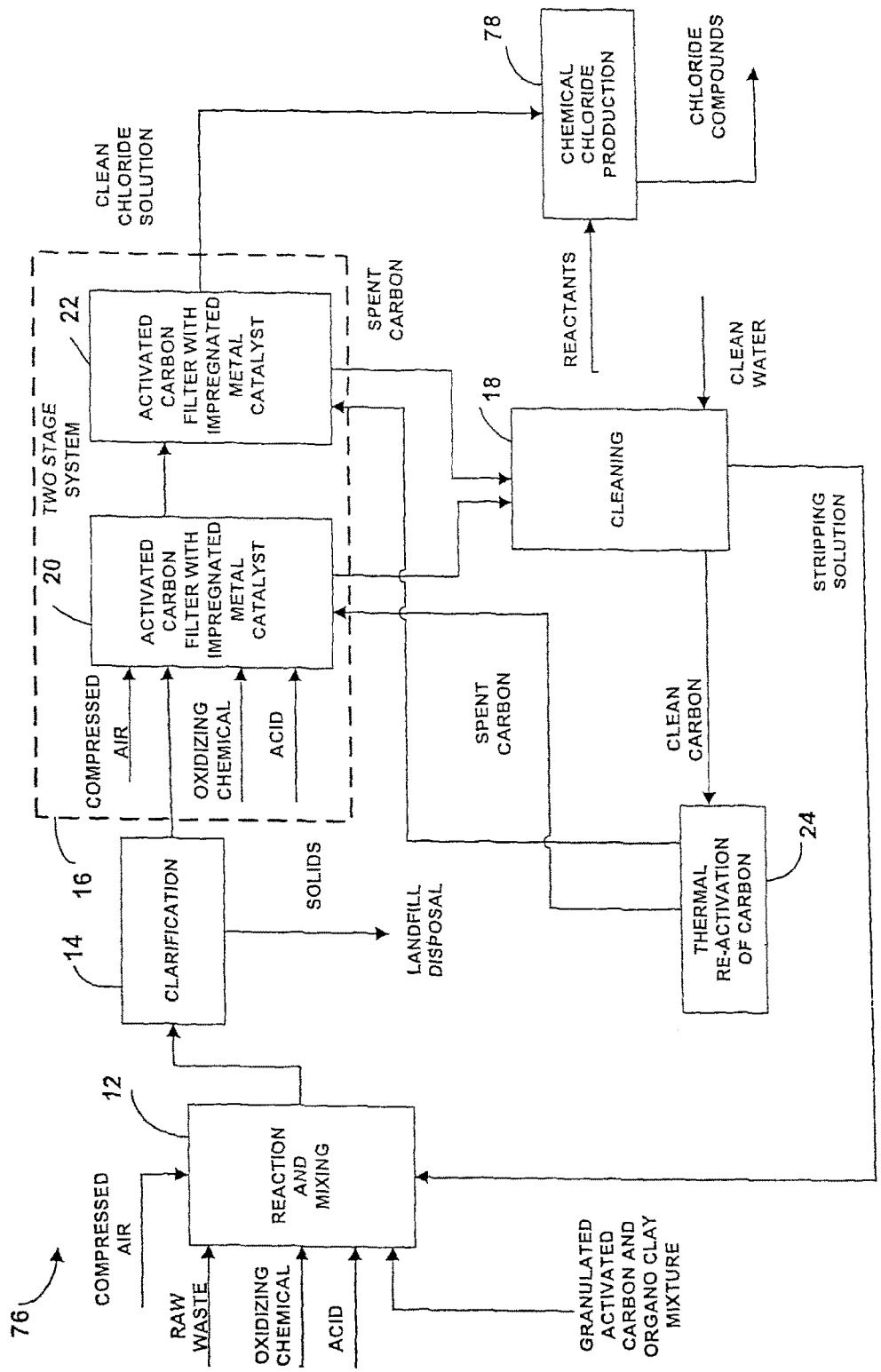
FIG. 4 is a conceptual flow diagram of the method shown in FIG. 1, illustrating a chemical chloride production step.
Figure 5:
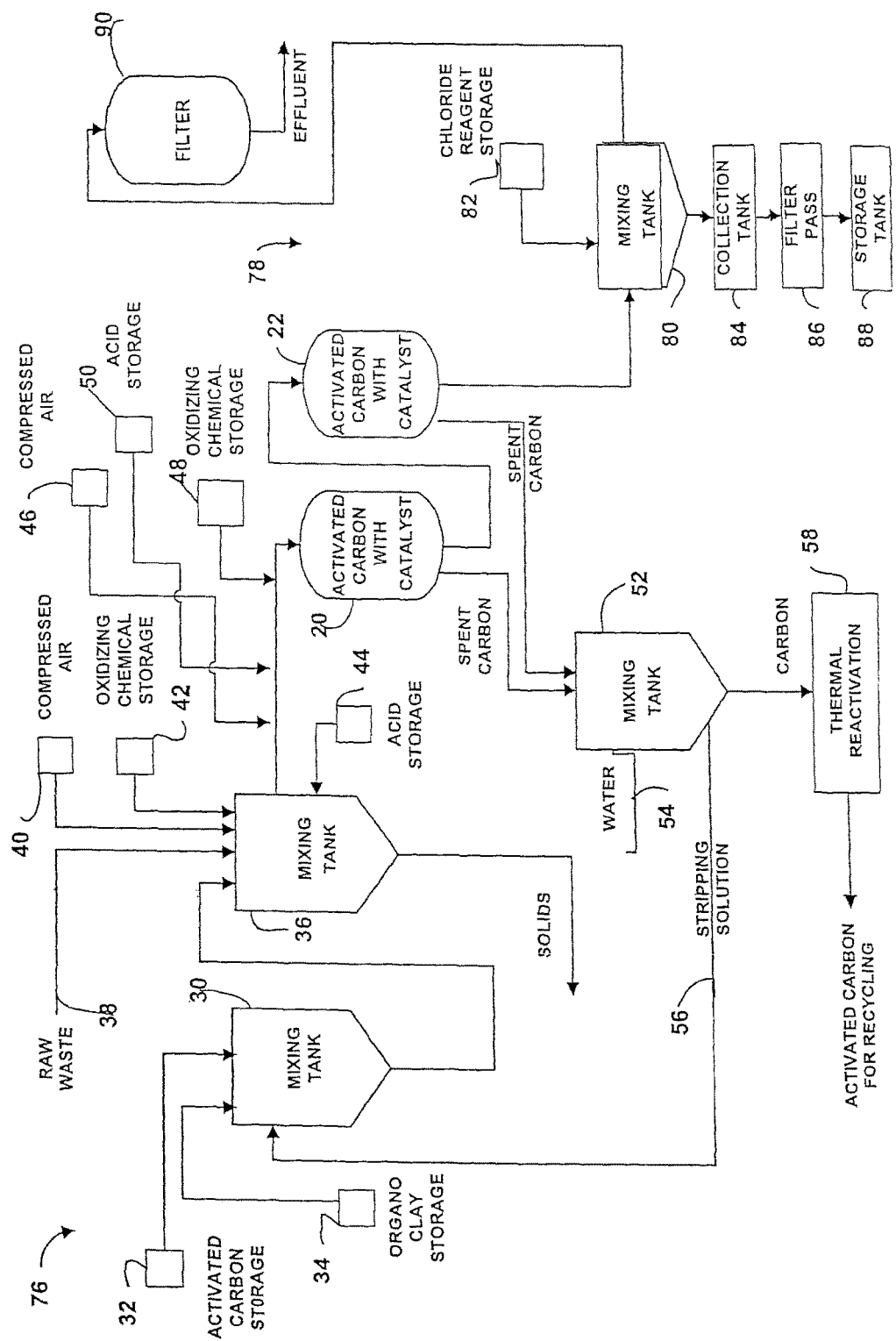
FIG. 5 is a process flow diagram for the method shown in FIG. 4.

Referring now to FIGS. 4-5, there is illustrated another embodiment of an apparatus for treating waste water generally designated by the numeral 76 in which like elements are identified by like numerals shown in FIGS. 1-3. The apparatus 86 includes a pretreatment unit 12 having the first mixing tank 30 for coating activated carbon particles with organo clay and the second mixing tank 36 for pretreating the brine waste water stream 38. The apparatus 76 also includes the clarification unit 14, the filtration unit 16, and the carbon cleaning system 18 for recycling spent carbon from the filtration unit 16.

Unlike the embodiments shown in FIGS. 1-3, the apparatus 76 includes a finishing unit 78 for the production of chloride compounds from the clean chloride solution. The finishing unit 78 includes a mixing tank 80, shown in FIG. 5, for receiving the clean chloride solution and a chloride reagent storage unit 82 that directs chemical reagents into the mixing tank 80 to produce chemical products.

The mixing tank 80 directs the portion of the solution to a collecting tank 84 that includes a filter 86 for recovering the chemical product from the solution. The filter 86 is connected in series with a storage tank 88 for storing the chemical product. The remaining portion of the solution is directed to a filter 90 for polishing and discharge as effluent from the apparatus 76.

As also shown in FIG. 5, the reagent storage unit 82 stores a suitable reagent for reacting with the chloride in the clean chloride solution in mixing tank 80 to form a suitable chloride compound. Suitable reagents include carbonate-based materials, such as zinc carbonate, oxide based materials, such as zinc oxide, or hydroxide materials, such as calcium hydroxide.

Sequence No. 4

Figure 6:
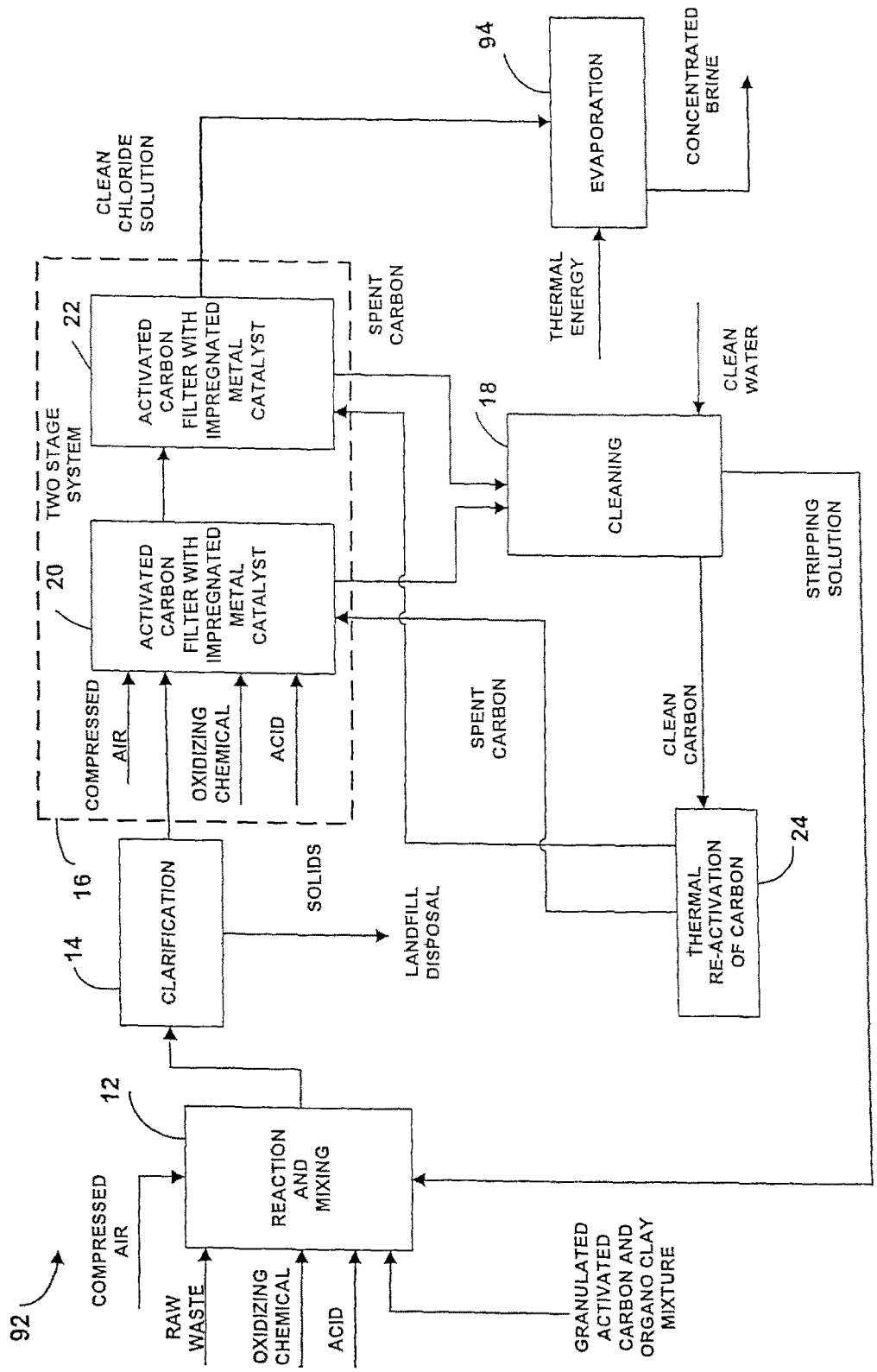
FIG. 6 is a conceptual flow diagram of the method shown in FIG. 1, illustrating a distillation step.
Figure 7:
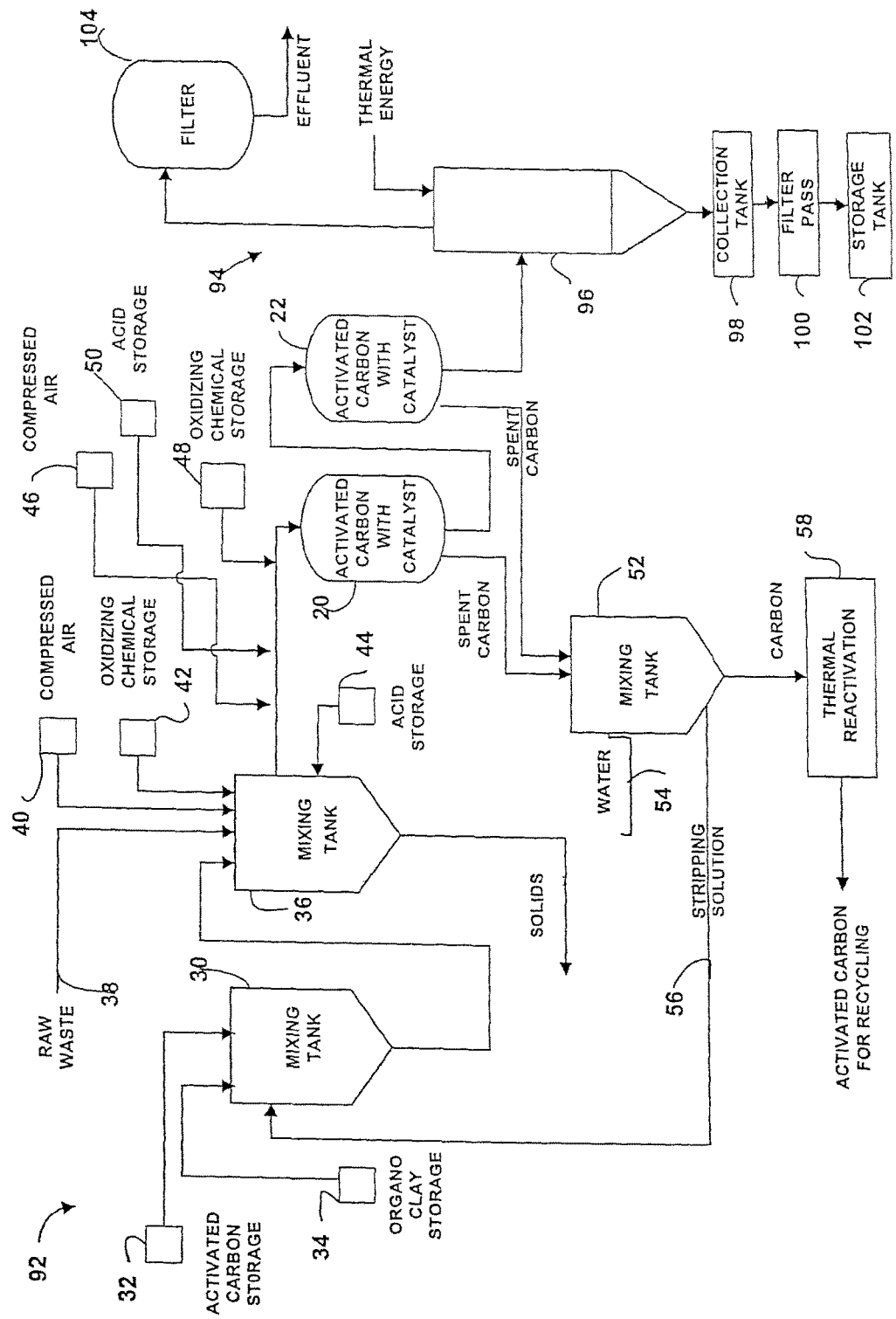
FIG. 7 is a process flow diagram for the method shown in FIG. 6.

Referring now to FIGS. 6-7, there is illustrated another embodiment of an apparatus for treating waste water generally designated by the numeral 92 in which like elements are identified by like numerals shown in FIGS. 1-5. The apparatus 92 includes a pretreatment unit 12, a clarification unit 14, a filtration unit 16, and a carbon cleaning system 18.

Unlike the embodiments shown in FIGS. 1-5, the apparatus 92 includes a finishing unit 94 shown in FIG. 7, that includes a distillation unit 96 that receives the clean carbon solution from the filtration unit 16. Preferably, the distillation unit 96 includes a chemical that maintains the pH of the clean chloride solution within the distillation unit 96 at a predetermined level.

The distillation unit 96 is connected to a suitable thermal energy source that provides thermal energy to facilitate distillation of water from one fraction of the clean chloride solution, which is directed to a collection tank 98 and a storage tank 102. The other fraction is directed to a filter 104 prior to discharge.

The collection tank 98 collects the salt residue from the clean chloride solution. The storage tank 102 holds the residual salt product, which is suitable for use in commercial applications.

Sequence No. 5

Figure 8:
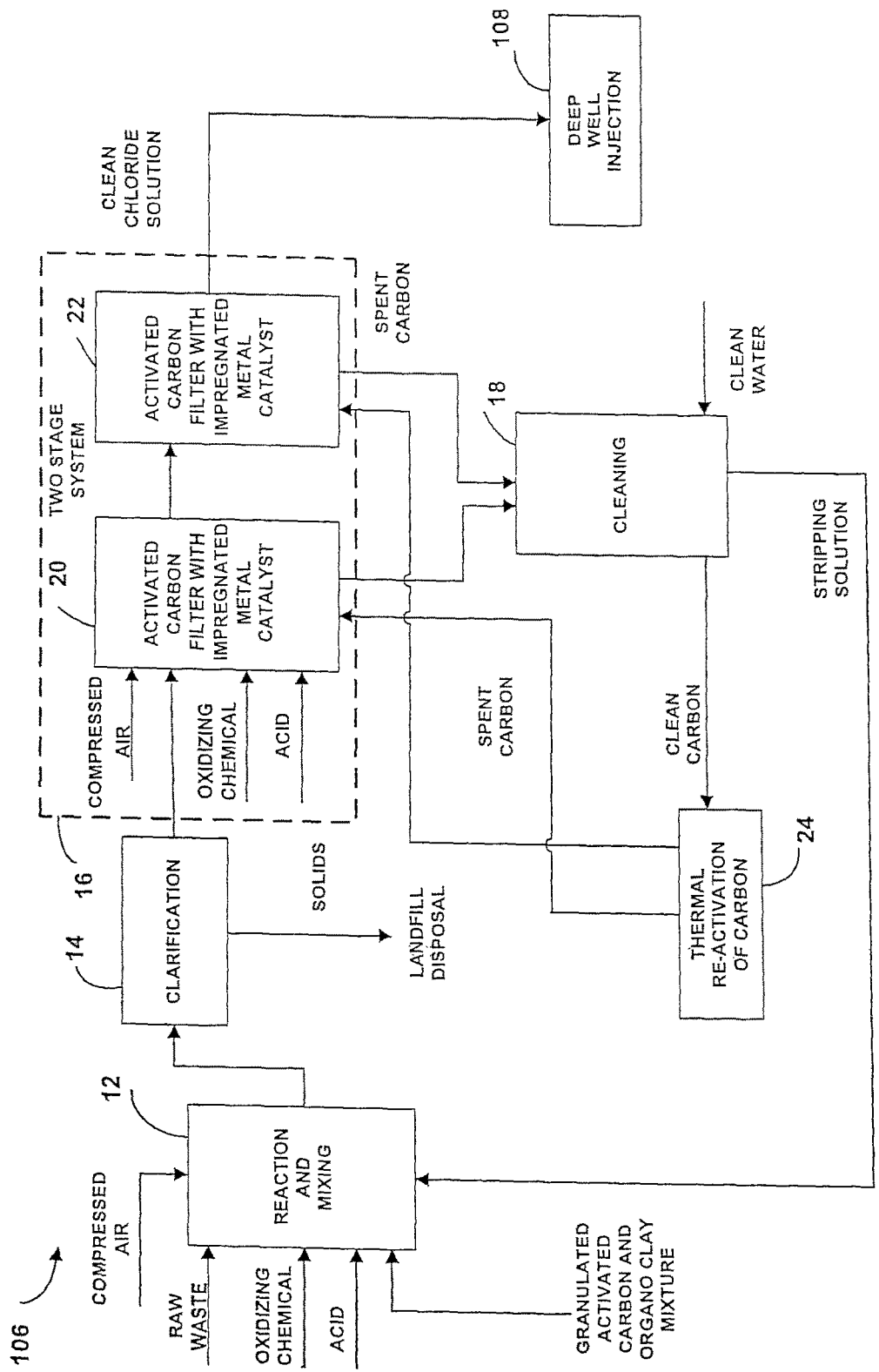
FIG. 8 is a conceptual flow diagram of the method shown in FIG. 1, illustrating effluent injected into a deep well.
Figure 9:
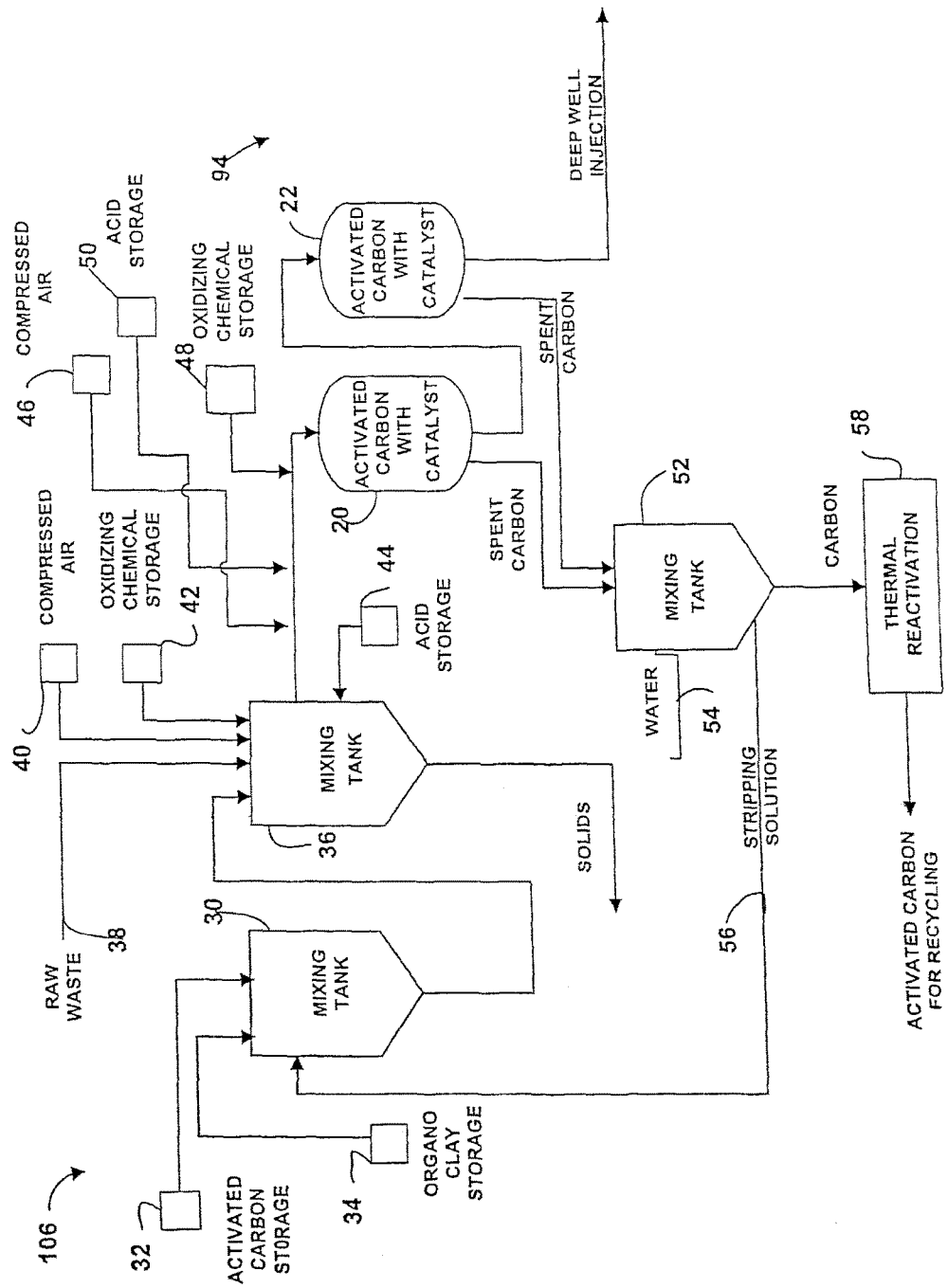
FIG. 9 is a process flow diagram for the method shown in FIG. 8.

Referring now to FIGS. 8-9, there is shown another embodiment of an apparatus for treating waste water generally designated by the numeral 106 in which like elements are identified by like numerals shown in FIGS. 1-7. The apparatus 106 includes the pretreatment unit 12, the clarification unit 14, the filtration unit 16, and the carbon cleaning system 18.

Unlike the embodiments shown in FIGS. 1-7, the apparatus 106 is particularly adapted for deep well injection 108 of the clean chloride solution. Injection of the raw waste stream, which includes organic compounds, heavy metals, oil and grease, barium, and radio nuclei, into a deep well is undesirable.

Mixing the contaminants in the raw waste water with the ground water can plug up drilling equipment and contaminate the ground water. The water treatment provided by the apparatus 106 removes a sufficient quantity of organic compounds, heavy metals, and oil and grease to make deep well injection environmentally feasible.

The location of the deep well relative to the apparatus 106 is not critical. Preferably, the clean chloride solution is produced by the apparatus 106 at one site and transported to the deep well. Alternatively, the apparatus 106 is located at a site that is adjacent to the deep well.

Sequence No. 6

Figure 10:
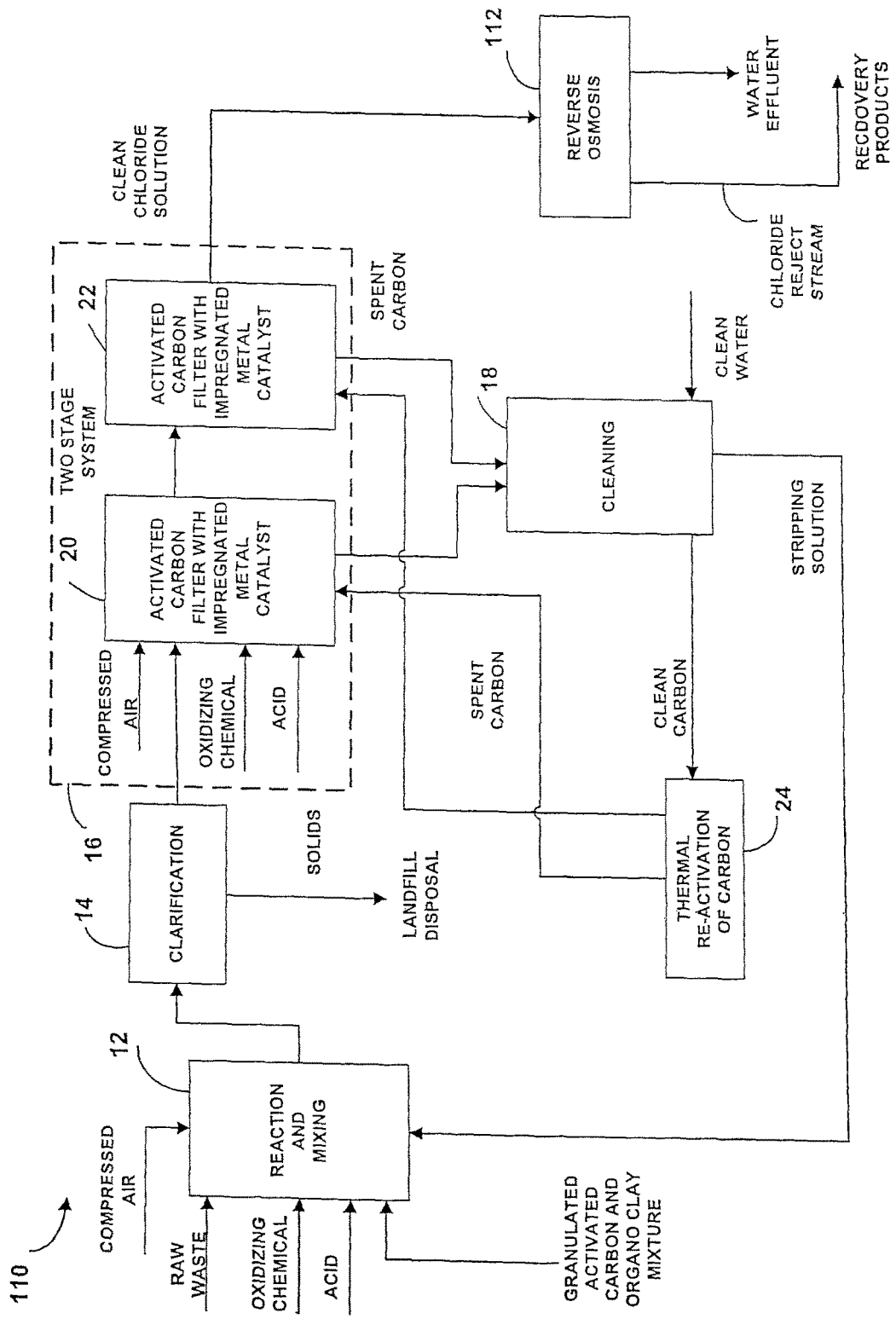
FIG. 10 is a conceptual flow diagram of the method shown in FIG. 1, illustrating a reverse osmosis step.
Figure 11:
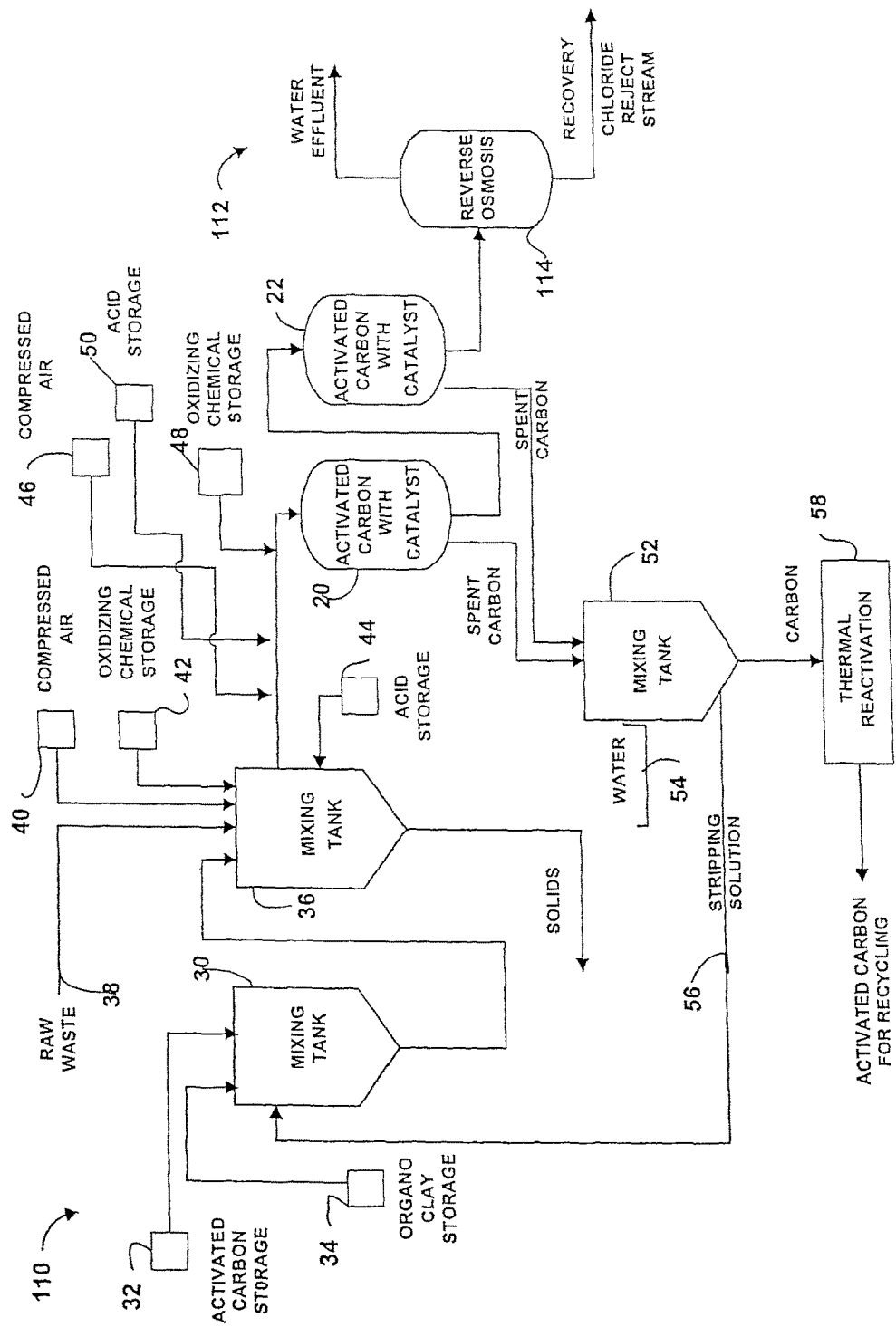
FIG. 11 is a process flow diagram for the method shown in FIG. 10.

Referring now to FIGS. 10-11, there is shown another embodiment of an apparatus for treating waste water generally designated by the numeral 110 in which like elements are identified by like numerals shown in FIGS. 1-9. The apparatus 110 includes the pretreatment unit 12, the clarification unit 14, the filtration unit 16, and the carbon cleaning system 18.

Unlike the embodiments shown in FIGS. 1-9, the apparatus 110 is particularly adapted for performing a reverse osmosis step 112 on the clean chloride solution. The apparatus 110 includes a filter 114 that is specially adapted for reverse osmosis operations.

A typical reverse osmosis unit operates at approximately 80% efficiency for this particular waste water stream. The removal of between 10% and 12.5% of the chlorides in the waste water stream by the filtration unit 16 allows the reverse osmosis filter 114 to improve the efficiency to as much as about 90% to 95%.

The preferred embodiment is illustrated with a pretreatment step in which activated carbon, organo clay, acids, and oxidizing chemicals are used to pretreat the waste water stream. Alternatively, polymers alone or in combination with the activated carbon, organo clay, acids, and oxidizing chemicals are added in the pretreatment step to raise the pH of the solution.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for treating water comprising the steps of:
providing a stream of brine water having in solution organic materials, heavy metals comprising metals selected from one or more of iron, aluminum, magnesium and zinc, and chlorides with a portion of the organic materials forming an emulsion therein,
mixing organo clay with particles of activated carbon, an acid selected from the group consisting of organic acids and mineral acids, and a peroxide compound to form a particle mixture of organo clay and activated carbon for treating the stream of brine water,
contacting the particle mixture of organo clay and activated carbon with the stream of brine water to remove the organic materials and the heavy metals from the stream of brine water, directing the particle mixture of organo clay and activated carbon and the stream of brine water into a filter system having a catalyst to form a clean chloride solution, directing the clean chloride solution into a distillation unit, and removing water from the clean chloride solution within the distillation unit.

2. A method as set forth in claim 1 which includes:

directing the clean chloride solution into a container having a sacrificial anode, and combining ions from the clean chloride solution to form a chloride-based compound.

3. A method as set forth in claim 1 which includes:

directing the clean chloride solution into a mixing tank, adding carbonate metal cation chemicals and a chemical selected from the group consisting of hydroxides and oxides to form a second mixture, and filtering the mixture to produce a purified effluent for discharge.

4. A method as set forth in claim 1 which includes:

directing the clean chloride solution into a mixing tank having a consumable anode and a cathode connected by a power supply, and applying a voltage between the consumable anode and the cathode to remove chloride from the clean chloride solution to produce a purified effluent for discharge.

5. A method as set forth in claim 1 which includes:

directing the clean chloride solution into a reverse-osmosis processing unit.

6. A method as set forth in claim 1 which includes:

injecting the clean chloride solution into a well.

7. A method for treating water comprising the steps of:

providing a stream of brine water having in solution organic materials, heavy metals comprising metals selected from one or more of iron, aluminum, magnesium and zinc, and chlorides with at least a portion of the organic materials forming an emulsion within the brine water, mixing organo clay with particles of activated carbon to form a particle mixture of organo clay and activated carbon for treating the stream of brine water, contacting the particle mixture of organo clay and activated carbon with the stream of brine water to remove the organic materials and the heavy metals from the stream of brine water, filtering the particle mixture of organo clay and activated carbon and stream of brine water to remove the particles of activated carbon to form a treated chloride solution, and adding an oxidizing chemical to the treated chloride solution to remove toxic organic materials to form a clean chloride solution.

8. A method as set forth in claim 7 wherein:

the oxidizing chemical includes a peroxide compound.

9. A method as set forth in claim 7 which includes:

adding an acid selected from the group consisting of organic acids and mineral acids to the particle mixture of organo clay and activated carbon.

10. A method as set forth in claim 7 which includes:

directing the clean chloride solution into a processing unit to perform a finishing process.

11. A method as set forth in claim 10 wherein:

the finishing process is selected from the group consisting of chemical product production, electrochemical production, reverse osmosis, distillation, and deep well injection on the clean chloride solution within the processing unit.

\* \* \* \* \*